(12) United States Patent
Suzuki

(10) Patent No.: US 8,978,722 B2
(45) Date of Patent: Mar. 17, 2015

(54) PNEUMATIC TIRE TREAD WITH GROOVE UNIT COMPRISING A MAIN GROOVE AND AN AUXILIARY GROOVE BOTH MEANDERING IN A WAVY OR ZIGZAG MANNER

(75) Inventor: Naoko Suzuki, Hiratsuka (JP)

(73) Assignee: The Yokohama Rubber Co., Ltd. (JP)

(*) Notice: Subject to any disclaimer, the term of this patent is extended or adjusted under 35 U.S.C. 154(b) by 0 days.

(21) Appl. No.: 13/554,384

(22) Filed: Jul. 20, 2012

(65) Prior Publication Data
US 2013/0037191 A1 Feb. 14, 2013

(30) Foreign Application Priority Data

Aug. 10, 2011 (JP) ................................. 2011-174588

(51) Int. Cl.
*B60C 11/04* (2006.01)
*B60C 11/117* (2006.01)
*B60C 11/12* (2006.01)
*B60C 11/03* (2006.01)

(52) U.S. Cl.
CPC ............ *B60C 11/0306* (2013.01); *B60C 11/04* (2013.01); *B60C 11/0318* (2013.01); *B60C 11/1236* (2013.01); *B60C 2011/0353* (2013.01); *B60C 2011/0346* (2013.01);
(Continued)

(58) Field of Classification Search
CPC ...................................................... B60C 11/04
USPC ........... 152/209.3, 209.18, 209.8, 209.9, 900, 152/209.27, 209.15, DIG. 3; D12/520, 516, D12/515, 514, 512

IPC ........................................................ B60C 11/04
See application file for complete search history.

(56) References Cited

U.S. PATENT DOCUMENTS 3,405,753 A * 10/1968 Verdier ....................... 152/209.9
3,674,076 A * 7/1972 Dailey, Jr. .................. 152/209.18
(Continued)

FOREIGN PATENT DOCUMENTS

EP 711676 A1 * 5/1996 ............... B60C 11/04
JP 57004409 A * 1/1982 ............... B60C 11/06
(Continued)

OTHER PUBLICATIONS

Machine Translation: JP2009-143301A; Tanaka, Yoshitaka; (no date).*
(Continued)

*Primary Examiner* — Steven D Maki
*Assistant Examiner* — Kendra Shin
(74) *Attorney, Agent, or Firm* — Thorpe North & Western

(57) ABSTRACT

A pneumatic tire comprising a tread portion, side wall portions, and bead portions. The tread portion of said pneumatic tire includes at least one groove unit including a main groove extending in a tire circumferential direction and an auxiliary groove extending in the tire circumferential direction that has a smaller width than that of the main groove. The main groove and/or the auxiliary groove meanders in a wave or zigzag manner, and the main groove and the auxiliary groove intersect so as to intertwine with each other. Additionally, a rib portion extending in the tire circumferential direction is disposed adjacent along the groove unit including the main groove and the auxiliary groove.

20 Claims, 5 Drawing Sheets

(52) U.S. Cl.
CPC ....... *B60C 2011/0348* (2013.01); *Y10S 152/90* (2013.01); *Y10S 152/03* (2013.01)
USPC ................ 152/209.18; 152/209.8; 152/209.9; 152/900; 152/209.27; 152/DIG. 3

(56) References Cited

U.S. PATENT DOCUMENTS 4,462,446 A * 7/1984 Goergen et al. .......... 152/209.18
6,478,062 B1 * 11/2002 Schomburg ............. 152/209.15

FOREIGN PATENT DOCUMENTS

| JP | 2004-351954 | | 12/2004 | |
|---|---|---|---|---|
| JP | 2009143301 A | * | 7/2009 | .............. B60C 11/12 |
| JP | 2010-179892 | | 8/2010 | |

OTHER PUBLICATIONS

Summary: JP57-004409; Takigawa, Hiroyoshi; (no date).*

* cited by examiner

PNEUMATIC TIRE TREAD WITH GROOVE UNIT COMPRISING A MAIN GROOVE AND AN AUXILIARY GROOVE BOTH MEANDERING IN A WAVY OR ZIGZAG MANNER

PRIORITY CLAIM

Priority is claimed to Japan Patent Application Serial No. 2011-174588 filed on Aug. 10, 2011.

BACKGROUND

1. Technical Field

The present technology relates to a pneumatic tire in which main grooves extending in a tire circumferential direction are provided in a tread portion, and particularly relates to a pneumatic tire whereby traveling performance on wet road surfaces (hereinafter referred to as "wet performance") and quietness can be improved in a well-balanced manner.

2. Related Art

Conventionally, with pneumatic tires, a plurality of main grooves extending in a tire circumferential direction is formed in a tread portion. These main grooves contribute greatly to water drainage properties. Facilitating the flow of water in the main grooves by periodically varying a groove width of the main grooves along the tire circumferential direction in order to improve the water drainage properties derived from such main grooves has been proposed (e.g. see Japanese Unexamined Patent Application Publication No. 2010-179892A). However, with the current technology, a definite improvement in wet performance cannot be achieved by simply varying the groove width of the main grooves.

Additionally, because circumferential grooves such as main grooves and the like that are formed in the tread portion are a source of air column resonance, efforts have been made to reduce noise originating from the circumferential grooves and, thereby, improve quietness. A technique has been proposed for this purpose in which vibration frequencies generated when the tread portion contacts the ground are varied along a tire circumference by branching a portion of the circumferential grooves in the tire circumferential direction (e.g. see Japanese Unexamined Patent Application Publication No. 2004-351954A). However, in this case, there is a problem in that wet performance may be insufficient because water easily accumulates in portions of the branched circumferential grooves where the grooves recombine.

SUMMARY

The present technology provides a pneumatic tire whereby wet performance and quietness can be improved in a well-balanced manner. A pneumatic tire of the present technology includes a tread portion extending in a tire circumferential direction to form an annular shape, a pair of side wall portions disposed on both sides of the tread portion, and a pair of bead portions disposed on inner sides in a tire radial direction of the side wall portions. The tread portion of said pneumatic tire includes at least one groove unit including a main groove extending in the tire circumferential direction and an auxiliary groove extending in the tire circumferential direction that has a smaller width than that of the main groove. The main groove and/or the auxiliary groove meanders in a wave or zigzag manner, and the main groove and the auxiliary groove intersect so as to intertwine with each other. Additionally, a rib portion extending in the tire circumferential direction is disposed adjacent along the groove unit including the main groove and the auxiliary groove.

In the present technology, the tread portion includes a groove unit including a main groove extending in the tire circumferential direction and an auxiliary groove extending in the tire circumferential direction that has a smaller width than that of the main groove. The main groove and/or the auxiliary groove meanders in a wave or zigzag manner, and a structure is used in which the main groove and the auxiliary groove intersect so as to intertwine with each other. Therefore, water drainage properties can be enhanced and wet performance can be increased due to the edge effects of the main grooves and the auxiliary grooves. Additionally, a rib portion extending in the tire circumferential direction is disposed adjacent along the groove unit including the main groove and the auxiliary groove. Therefore, declines in rigidity of the tread portion caused by the intersecting of the main groove and the auxiliary groove can be suppressed, and excellent wet performance can be maintained. On the other hand, the main groove and/or the auxiliary groove meanders in a wave or zigzag manner and, therefore, generation of air column resonance originating from the main grooves and the auxiliary grooves can be suppressed and quietness can be enhanced.

In the present technology, a groove width of the main groove and/or the auxiliary groove preferably varies along the tire circumferential direction. By configuring the groove width of the main groove or the auxiliary groove to vary, a Venturi effect is produced in the water flow in the grooves when traveling and, thus, water drainage properties can be further enhanced. Particularly, the groove width of the main groove, which contributes greatly to the water drainage properties, is preferably varied. Note that, in the present technology, "groove width" is the opening width of a groove, measured along a tire width direction at the road contact surface of the tread portion.

In the present technology, it is necessary that the main groove and/or the auxiliary groove be meandering in a wave or zigzag manner, but it is particularly preferable that both the main groove and the auxiliary groove be meandering in a wave or zigzag manner. In this case, groove area can be sufficiently ensured and edge effect can be increased. Therefore, wet performance can be enhanced and, furthermore, air column resonance can be reduced and quietness can be enhanced.

A groove width of the auxiliary groove preferably is not more than 70% of a groove width of the main groove at a portion where the width of the main groove is smallest. By configuring the auxiliary groove so as to be relatively narrower, extreme declines in the rigidity of the tread portion can be avoided and excellent wet performance can be displayed.

A groove depth of the auxiliary groove preferably is less than a groove depth of the main groove. By configuring the auxiliary groove so as to be relatively shallower, collapsing of block portions partitioned between the main groove and the auxiliary groove can be suppressed and excellent wet performance can be displayed.

A phase of the main groove and a phase of the auxiliary groove preferably differ from each other within the groove unit. As a result, extreme declines in the rigidity of the tread portion can be avoided and excellent wet performance can be displayed.

At least two of the groove units are preferably provided in the tread portion. As a single unit, the groove unit including the main groove and the auxiliary groove as described above improves the wet performance and the quietness in a well-balanced manner. Moreover, these effects can be amplified by disposing a plurality of the groove units in the tread portion.

Phases of the groove units preferably differ from each other. By offsetting the phases of the groove units per unit, vibration frequency when the tread portion contacts the ground can be dispersed, the peak sound pressure level can be reduced, and the quietness can be further enhanced.

Additionally, an amplitude of the main groove included in a first groove unit of the groove units and an amplitude of the main groove included in a second groove unit of the groove units preferably differ from each other. By disposing main grooves with differing amplitudes for each of the groove units, vibration frequency when the tread portion contacts the ground can be dispersed, the peak sound pressure level can be reduced, and the quietness can be further enhanced.

DETAILED DESCRIPTION

Figure 1:
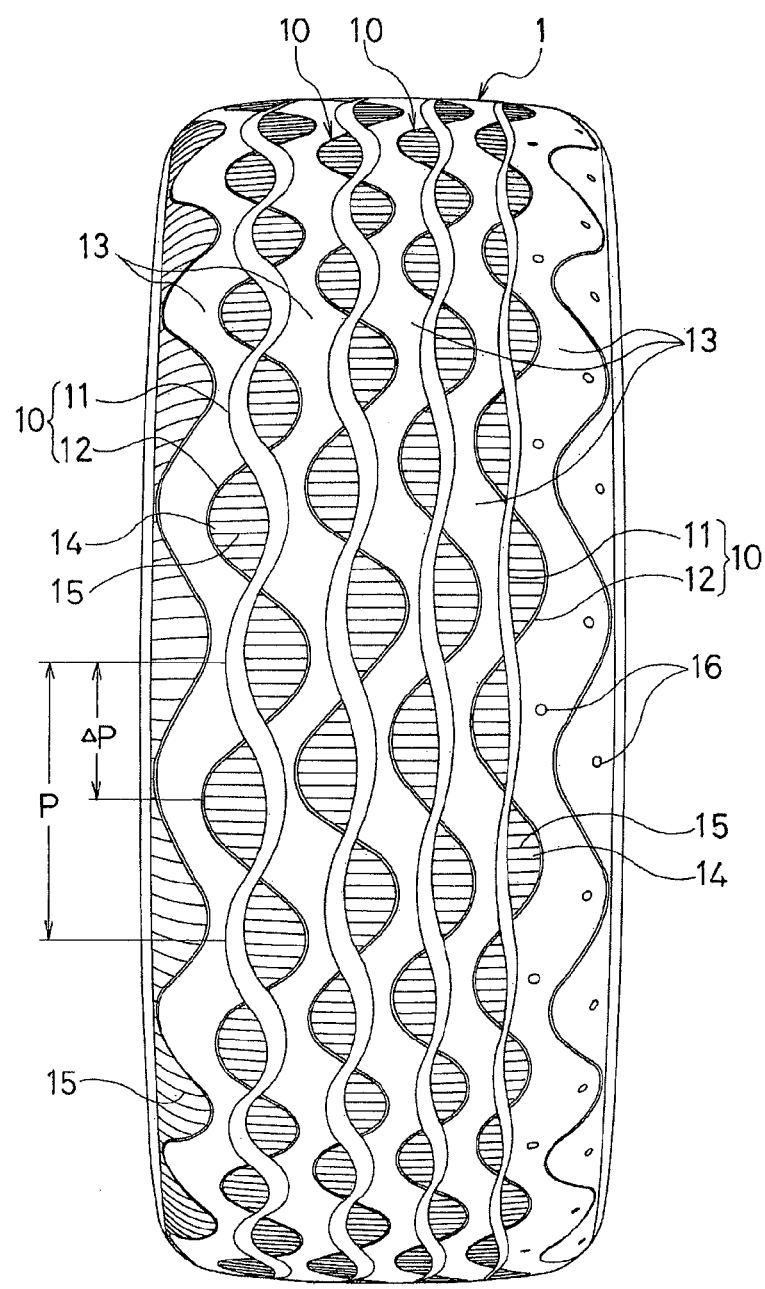
FIG. 1 is a front view illustrating a pneumatic tire according to an embodiment of the present technology.
Figure 2:
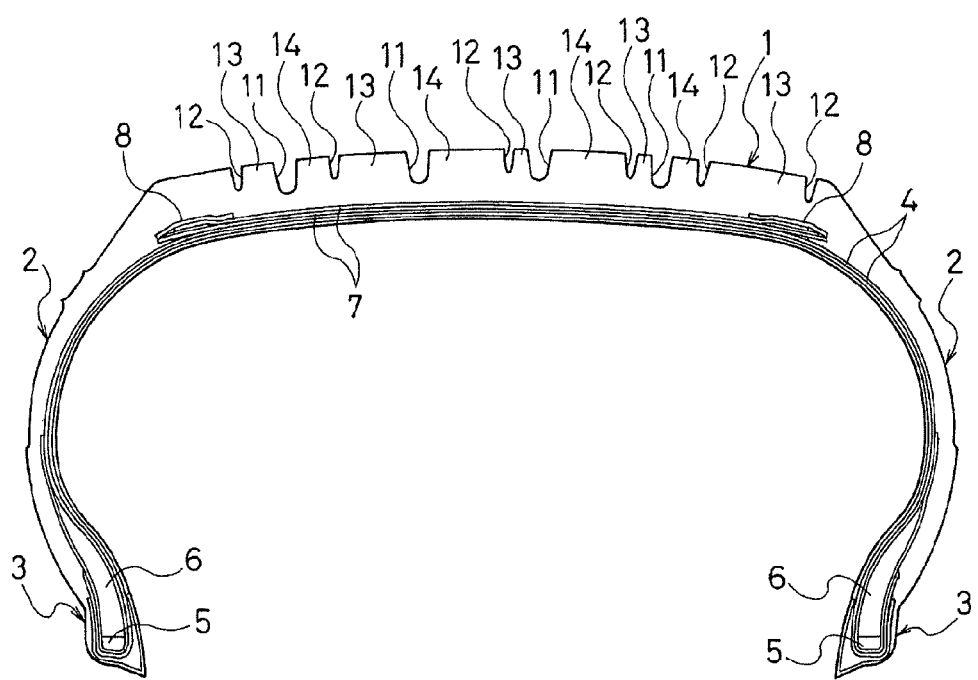
FIG. 2 is a meridian cross-sectional view illustrating the pneumatic tire according to the embodiment of the present technology.

Detailed descriptions will be given below of a configuration of the present technology with reference to the accompanying drawings. FIGS. 1 and 2 illustrate a pneumatic tire according to an embodiment of the present technology. As illustrated in FIGS. 1 and 2, a pneumatic tire of this embodiment is provided with a tread portion 1 extending in a tire circumferential direction to form an annular shape, a pair of side wall portions 2,2 that are disposed on both sides of the tread portion 1, and a pair of bead portions 3,3 that are disposed on inner sides in a tire radial direction of the side wall portions 2.

Two layers of a carcass layer 4 are mounted between the pair of bead portions 3,3. The carcass layer 4 includes a plurality of reinforcing cords extending in the tire radial direction, and is folded back around a bead core 5 disposed in each of the bead portions 3 from a tire inner side to a tire outer side. A bead filler 6 having a triangular cross-sectional shape formed from rubber composition is disposed on a periphery of the bead core 5.

On the other hand, a plurality of layers of a belt layer 7 is embedded on an outer circumferential side of the carcass layer 4 in the tread portion 1. These belt layers 7 include a plurality of reinforcing cords that incline with respect to the tire circumferential direction and the reinforcing cords are disposed between the layers so as to intersect each other. In the belt layers 7, an inclination angle of the reinforcing cords with respect to the tire circumferential direction is set in a range from, for example, 10° to 40°. Steel cords are preferably used as the reinforcing cords of the belt layers 7. For the purpose of enhancing high-speed durability, at least one layer of a belt cover layer 8 formed by arranging reinforcing cords at an angle of, for example, not more than 5° with respect to the tire circumferential direction, is disposed on an outer circumferential side of the belt layers 7. Nylon, aramid, or similar organic fiber cords are preferably used as the reinforcing cords of the belt cover layer 8.

Note that the tire internal structure described above is exemplary of a pneumatic tire, but is not limited thereto.

As illustrated in FIG. 1, a plurality of groove units 10 including a main groove 11 extending in a tire circumferential direction and an auxiliary groove 12 extending in the tire circumferential direction that has a smaller width than that of the main groove 11 is formed in a tread portion 1. Both the main groove 11 and the auxiliary groove 12 meander in a wave or zigzag manner, and the main groove 11 and the auxiliary groove 12 intersect so as to intertwine with each other. Dimensions of the main groove 11 are not particularly limited and, for example, a groove width is set to be in a range from 3.0 mm to 15.0 mm and a groove depth is set to be in a range from 5.0 mm to 10.0 mm. Dimensions of the auxiliary groove 12 are not particularly limited and, for example, a groove width is set to be in a range from 2.0 mm to 10.0 mm and a groove depth is set to be in a range from 4.0 mm to 9.0 mm.

A rib portion 13 extending in the tire circumferential direction is partitioned in the tread portion 1 so as to be adjacent to the groove unit 10 including the main groove 11 and the auxiliary groove 12. Additionally, a plurality of block portions 14 independent of the rib portion 13 is partitioned between the main groove 11 and the auxiliary groove 12. A plurality of sipes 15 extending straight in a tire width direction is formed in each of the block portions 14. Furthermore, an independent auxiliary groove 12 extending in the tire circumferential direction while meandering is formed in a first shoulder region (the left side in the drawing) of the tread portion 1, and a plurality of sipes 15 extending on an outer side in the tire width direction from the auxiliary groove 12 in the first shoulder region is also formed in the first shoulder region. An independent auxiliary groove 12 extending in the tire circumferential direction while meandering is formed in a second shoulder region (the right side in the drawing) of the tread portion 1, and dimples 16 are formed so as to be interspersed along the auxiliary groove 12 in the second shoulder region.

In the pneumatic tire described above, the tread portion 1 includes the groove unit 10 including the main groove 11 extending in the tire circumferential direction and the auxiliary groove 12 extending in the tire circumferential direction that has a smaller width than that of the main groove 11. The main groove 11 and/or the auxiliary groove 12 meanders in a wave or zigzag manner, and a structure is used in which the main groove 11 and the auxiliary groove 12 intersect so as to intertwine with each other. Therefore, water drainage properties and edge effects of the main grooves 11 and the auxiliary grooves 12 can be improved and, thus, wet performance can be enhanced.

Additionally, a rib portion 13 extending in the tire circumferential direction is disposed adjacent along the groove unit 10 including the main groove 11 and the auxiliary groove 12. Therefore, declines in the rigidity of the tread portion 1 caused by the intersecting of the main groove 11 and the auxiliary groove 12 can be suppressed, and excellent wet performance can be maintained.

Note that in the pneumatic tire described above, the rib portion 13 may include sipes or may be subjected to surface processing as necessary. Likewise, the block portions 14 may include sipes or may be subjected to surface processing as necessary. Here, "sipes" are defined as grooves having a groove width from 0.3 mm to 1.5 mm and a groove depth that is not less than 2.0 mm and is not greater than the groove depth of the main groove 11. Additionally, "surface processing" refers to the formation of a plurality of shallow grooves in the road contact surface of land portions, the shallow grooves having a groove width from 0.3 mm to 1.5 mm and a groove depth from 0.2 mm to 2.0 mm. These sipes and shallow grooves contribute to the enhancing of wet performance via their edge effects, but to not significantly cause a decrease in the rigidity of the tread portion 1.

On the other hand, the main groove 11 and/or the auxiliary groove 12 meanders in a wave or zigzag manner and, therefore, generation of air column resonance originating from the main groove 11 and the auxiliary groove 12 can be suppressed and quietness can be enhanced. Particularly, in cases where both the main groove 11 and the auxiliary groove 12 meander in a wave or zigzag manner, groove area can be sufficiently ensured and edge effect can be increased. Therefore, wet performance can be enhanced and, furthermore, air column resonance can be reduced and quietness can be enhanced. Additionally, in cases where the main groove 11 is formed in a wave or zigzag manner, the effect of reducing air column resonance will be prominent.

In the pneumatic tire described above, the groove width of the main groove 11 and/or the auxiliary groove 12 preferably varies along the tire circumferential direction. By configuring the groove width of the main groove 11 or the auxiliary groove 12 to vary, a Venturi effect is produced in the water flow in the grooves when traveling and, thus, water drainage properties of the meandering main groove 11 or auxiliary groove 12 can be further enhanced. Particularly, the groove width of the main groove 11, which contributes greatly to the water drainage properties, is preferably varied. More specifically, the groove width of the main groove 11 at a portion where the width of the main groove 11 is smallest is preferably from 20% to 70% of the groove width of the main groove 11 at a portion where the width of the main groove 11 is greatest. If the groove width of the main groove 11 at the portion where the width of the main groove 11 is smallest is less than 20% of the groove width of the main groove 11 at the portion where the width of the main groove 11 is greatest, water flow at the portion where the groove width is smallest will be obstructed and, conversely, if greater than 70%, the Venturi effect will weaken.

The groove width of the auxiliary groove 12 preferably is not more than 70% and more preferably not less than 40% and not more than 70% of the groove width of the main groove 11 at a portion where the width of the main groove 11 is smallest. By configuring the auxiliary groove 12 so as to be relatively narrower, extreme declines in the rigidity of the tread portion 1 can be avoided and excellent wet performance can be displayed. If the groove width of the auxiliary groove 12 exceeds 70% of the groove width at the portion where the width of the main groove 11 is smallest, the rigidity of the tread portion 1 may decline and the wet performance may be negatively affected.

The groove depth of the auxiliary groove 12 is preferably less than the groove depth of the main groove 11. By configuring the auxiliary groove 12 so as to be relatively shallower, collapsing of the block portions 14 partitioned between the main groove 11 and the auxiliary groove 12 can be suppressed and excellent wet performance can be displayed. More specifically, the groove depth of the auxiliary groove 12 is preferably not more than 80%, and more preferably not less than 30% and not more than 80% of the groove depth of the main groove 11. If the groove depth of the auxiliary groove 12 exceeds 80% of the groove depth of the main groove 11, the block portions 14 may collapse and the wet performance may be negatively affected.

A phase of the main groove 11 and a phase of the auxiliary groove 12 preferably differ from each other within the groove unit 10. That is, in FIG. 1, a phase difference ΔP is preferably provided with respect to a period P of the main groove 11. As a result, extreme declines in the rigidity of the tread portion 1 can be avoided and excellent wet performance can be displayed. More specifically, the phase difference ΔP between the main groove 11 and the auxiliary groove 12 with respect to the period P (360°) of the main groove 11 is preferably configured so as to be not less than 90° and not more than 270°. If the phase difference ΔP is outside the range described above, the block portions 14 will become excessively small and rigidity will decline and, thus, the wet performance may be negatively affected.

At least two of the groove units 10 are preferably provided in the tread portion 1. By disposing a plurality of the groove unit 10 in the tread portion 1, the effects of improving the wet performance and the quietness in a well-balanced manner can be amplified.

When disposing the plurality of the groove unit 10 in the tread portion 1, phases of the plurality of the groove unit 10 preferably differ from each other. In FIG. 1, the phases of four of the groove units 10 are offset from each other. By offsetting the phases of the groove unit 10 per unit, vibration frequency when the tread portion 1 contacts the ground can be dispersed, the peak sound pressure level can be reduced, and the quietness can be further enhanced.

Additionally, an amplitude of the main groove 11 included in a first groove unit 10 of the groove units and an amplitude of the main groove 11 included in a second groove unit 10 of the groove units preferably differ from each other. In FIG. 1, the amplitude of the main grooves 11 included in the four groove units 10 is configured so as to gradually increase toward a first edge side (the left side in the drawing) in the tire width direction of the tread portion 1. By disposing the main grooves 11 with differing amplitudes for each of the groove units 10, vibration frequency when the tread portion 1 contacts the ground can be dispersed, the peak sound pressure level can be reduced, and the quietness can be further enhanced.

In the pneumatic tire described above, the amplitude of the main grooves 11 included in the plurality of the groove unit 10 is configured so as to gradually increase toward the first edge side (the left side in the drawing) in the tire width direction of the tread portion 1, and the groove width of the main grooves 11 included in the plurality of the groove unit 10 is configured so as to gradually increase toward the first edge side (the left side in the drawing) in the tire width direction of the tread portion 1. The pneumatic tire having the structure described above is preferably mounted on a vehicle such that the first edge side in the tire width direction of the tread portion 1 (the left side in the drawing) is on a vehicle inner side.

FIGS. 3A to 3H, 4A to 4D, and 5A to 5E illustrate various modified examples of tread patterns of the pneumatic tire of the present technology.

Figure 3A:
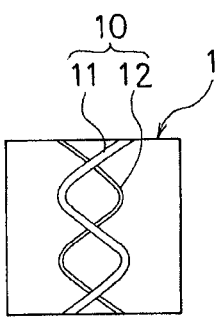
FIGS. 3A to 3H are expanded views schematically illustrating various modified examples of tread patterns of the pneumatic tire of the present technology.
Figure 3B:
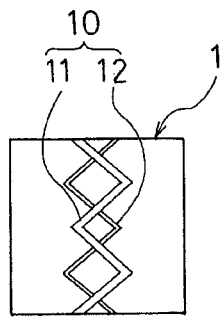
Figure 3C:
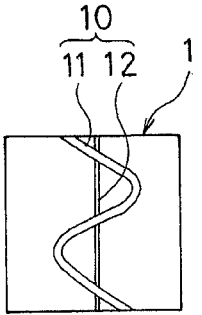
Figure 3D:
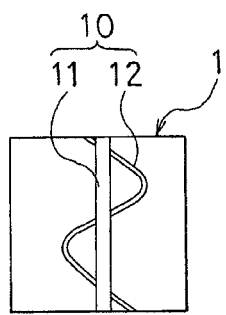
Figure 3E:
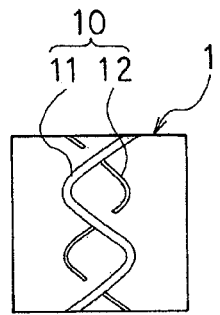
Figure 3F:
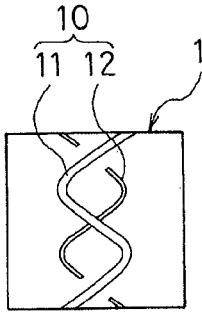
Figure 3G:
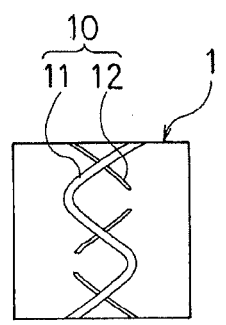
Figure 3H:
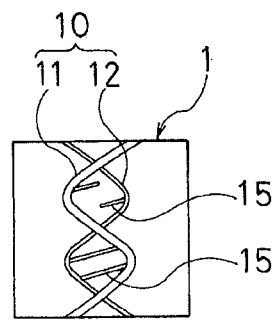
Figure 4A:
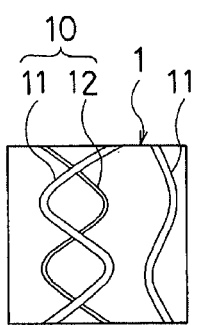
FIGS. 4A to 4D are expanded views schematically illustrating various modified examples of tread patterns of the pneumatic tire of the present technology.
Figure 4B:
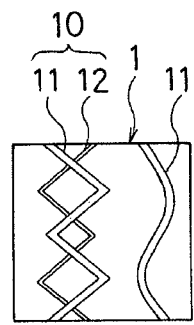
Figure 4C:
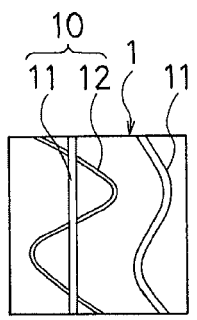
Figure 4D:
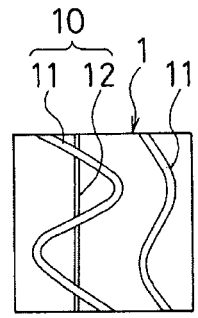

In FIGS. 3A to 3H, one of the groove unit 10 is disposed in the tread portion 1. In FIGS. 3A and 3B, both the main groove 11 and the auxiliary groove 12 are meandering. In contrast, in FIGS. 3C and 3D, only one of the main groove 11 and the auxiliary groove 12 is meandering. In FIGS. 3E to 3G, the auxiliary groove 12 is divided partway through. In cases such as where the auxiliary groove 12 is formed intermittently, it is sufficient that each section of the auxiliary groove 12 be in communication with the main groove 11. In FIG. 3H, a plurality of the sipes 15 is formed in the block portions 14 partitioned between the main groove 11 and the auxiliary groove 12. A portion of the sipes 15 has a structure that laterally crosses the block portions 14 and a remainder of the sipes 15 has a structure that does not laterally cross the block portions 14.

In FIGS. 4A to 4D, one of the groove unit 10 and an independent main groove 11 extending while meandering in the tire circumferential direction are disposed in the tread portion 1.

Figure 5A:
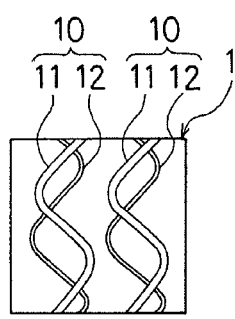
FIGS. 5A to 5E are expanded views schematically illustrating various modified examples of tread patterns of the pneumatic tire of the present technology.
Figure 5B:
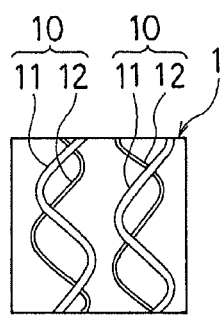
Figure 5C:
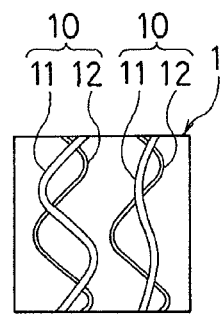
Figure 5D:
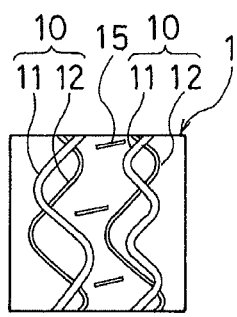
Figure 5E:
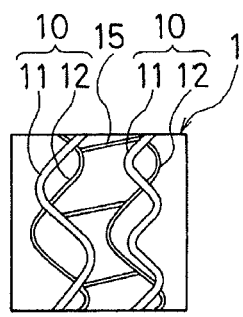

In FIGS. 5A to 5E, two of the groove units 10 are disposed in the tread portion 1. In FIG. 5A, the phases of the two of the groove units 10 are the same. In contrast, in FIG. 5B, the phases of the two of the groove units 10 differ from each other. In FIG. 5C, an amplitude of the main groove 11 included in a first groove unit 10 of the groove units and an amplitude of the main groove 11 included in a second groove unit 10 of the groove units differ from each other. In FIG. 5D, a plurality of the sipes 15 is formed in the rib portion 13 partitioned between the two of the groove units 10, and the sipes 15 have a structure that does not laterally cross the rib portion 13. In FIG. 5E, a plurality of the sipes 15 is formed in the rib portion 13 partitioned between the two of the groove units 10, and the sipes 15 have a structure that laterally crosses the rib portion 13.

Working Examples

Tires of Working Examples 1 to 20 were fabricated having a tire size of 205/55R16. These tires included a tread portion extending in a tire circumferential direction to form an annular shape, a pair of side wall portions disposed on both sides of the tread portion, and a pair of bead portions disposed on inner sides in a tire radial direction of the side wall portions. The tread portion of said pneumatic tire included at least one groove unit including a main groove extending in the tire circumferential direction and an auxiliary groove extending in the tire circumferential direction that has a smaller width than that of the main groove. The main groove and/or the auxiliary groove meanders in a wave or zigzag manner, and the main groove and the auxiliary groove intersect so as to intertwine with each other. Additionally, a rib portion extending in the tire circumferential direction was disposed adjacent along the groove unit including the main groove and the auxiliary groove. The number of main grooves, number of groove units, groove width of the auxiliary groove (ratio with respect to the groove width of the main groove), groove depth of the auxiliary groove (ratio with respect to the groove depth of the main groove), presence/absence of groove width variation of the main groove, form of the main groove, form of the auxiliary groove, amplitude relationship between main grooves, phase difference between the main groove and the auxiliary groove, presence/absence of phase difference of the groove units, and presence/absence of the sipes were varied as shown in Tables 1 and 2.

Tires for Conventional Examples 1 and 2 in which straight main grooves extending in the tire circumferential direction were provided in the tread portion in place of the groove unit, and tires for Comparative Examples 1 and 2 in which wave-like main grooves extending in the tire circumferential direction were provided in the tread portion in place of the groove unit were prepared for comparison.

In Conventional Examples 1 and 2, Comparative Examples 1 and 2, and Working Examples 1 to 20, in cases where the groove width of the main groove did not vary, the groove width of the main groove was 10.0 mm, and the groove depth of the main groove was 10.0 mm. In cases where the groove width of the main groove varied, the groove width of the main groove at the portion where the width of the groove was smallest was 2.0 mm, the groove width of the main groove at the portion where the width of the groove was greatest was 10.0 mm, and the groove depth of the main groove was 10.0 mm.

These test tires were evaluated for wet performance and quietness according to the following evaluation methods. The results thereof are shown in Tables 1 and 2.

Wet Performance

The test tires were assembled on wheels with a rim size of 16×6.5JJ, inflated to an air pressure of 200 kPa, and mounted on a test vehicle (front wheel drive vehicle) having an engine displacement of 1,600 cc. Braking distance was measured after ABS braking from a state of driving at a speed of 100 km/h until the vehicle came to a stop on a test course with a wet road surface. The evaluation results were indexed using the inverse of the measurement values. In Table 1, Conventional Example 1 was assigned an index value of 100, and in Table 2, Conventional Example 2 was assigned an index value of 100. A larger index value indicates shorter braking distance and superior wet performance.

Quietness

The test tires were assembled on wheels with a rim size of 16×6.5JJ, inflated to an air pressure of 200 kPa, and mounted on a test vehicle (front wheel drive vehicle) having an engine displacement of 1,600 cc. Sensory evaluations for cabin noise when coasting at a speed from 20 to 100 km/hr on a test course with a dry road surface were carried out by a test driver. The evaluation results were indexed. In Table 1, Conventional Example 1 was assigned an index value of 100, and in Table 2, Conventional Example 2 was assigned an index value of 100. Larger index values indicate superior quietness.

TABLE 1

| | Conventional Example 1 | Comparative Example 1 | Working Example 1 | Working Example 2 | Working Example 3 |
| --- | --- | --- | --- | --- | --- |
| Number of main grooves | 2 | 2 | 1 | 1 | 1 |
| Number of groove units | 0 | 0 | 1 | 1 | 1 |
| Groove width of the auxiliary groove (%) | — | — | 90 | 90 | 90 |
| Groove depth of the auxiliary groove (%) | — | — | 100 | 100 | 100 |
| Presence/absence of groove width variation of the main groove | Absent | Absent | Absent | Absent | Absent |
| Form of the main groove | Straight | Wave-like | Wave-like | Zigzag | Straight |
| Form of the auxiliary groove | — | — | Wave-like | Zigzag | Wave-like |

TABLE 1-continued

|  | | | | | |
|---|---|---|---|---|---|
| Amplitude relationship between main grooves | — | Same | — | — | — |
| Phase difference between the main groove and the auxiliary groove (°) | — | — | 180 | 180 | — |
| Presence/absence of phase difference of the groove units | — | — | — | — | — |
| Presence/absence of the sipes | Absent | Absent | Absent | Absent | Absent |
| Wet performance (index) | 100 | 96 | 103 | 103 | 103 |
| Quietness (index) | 100 | 98 | 103 | 103 | 103 |

|  | Working Example 4 | Working Example 5 | Working Example 6 | Working Example 7 | Working Example 8 |
|---|---|---|---|---|---|
| Number of main grooves | 2 | 1 | 1 | 1 | 1 |
| Number of groove units | 2 | 1 | 1 | 1 | 1 |
| Groove width of the auxiliary groove (%) | 90 | 70 | 70 | 70 | 70 |
| Groove depth of the auxiliary groove (%) | 100 | 100 | 80 | 80 | 80 |
| Presence/absence of groove width variation of the main groove | Absent | Absent | Absent | Present | Present |
| Form of the main groove | Wave-like | Wave-like | Wave-like | Wave-like | Wave-like |
| Form of the auxiliary groove | Wave-like | Wave-like | Wave-like | Straight | Wave-like |
| Amplitude relationship between main grooves | Same | — | — | — | — |
| Phase difference between the main groove and the auxiliary groove (°) | 180 | 180 | 180 | — | 180 |
| Presence/absence of phase difference of the groove units | Absent | — | — | — | — |
| Presence/absence of the sipes | Present | Absent | Absent | Absent | Absent |
| Wet performance (index) | 104 | 103 | 103 | 104 | 105 |
| Quietness (index) | 102 | 102 | 103 | 104 | 104 |

|  | Working Example 9 | Working Example 10 | Working Example 11 | Working Example 12 | Working Example 13 |
|---|---|---|---|---|---|
| Number of main grooves | 1 | 1 | 2 | 2 | 2 |
| Number of groove units | 1 | 1 | 2 | 2 | 2 |
| Groove width of the auxiliary groove (%) | 70 | 70 | 70 | 70 | 70 |
| Groove depth of the auxiliary groove (%) | 80 | 80 | 80 | 80 | 80 |
| Presence/absence of groove width variation of the main groove | Present | Present | Present | Present | Present |
| Form of the main groove | Wave-like | Wave-like | Wave-like | Wave-like | Wave-like |
| Form of the auxiliary groove | Wave-like | Wave-like | Wave-like | Wave-like | Wave-like |
| Amplitude relationship between main grooves | — | — | Same | Same | Different |
| Phase difference between the main groove and the auxiliary groove (°) | 90 | 180 | 180 | 180 | 180 |
| Presence/absence of phase difference of the groove units | — | — | Absent | Present | Present |
| Presence/absence of the Sipes | Absent | Absent | Absent | Absent | Absent |
| Wet performance (index) | 105 | 105 | 107 | 107 | 107 |
| Quietness (index) | 106 | 106 | 106 | 107 | 108 |

TABLE 2

|  | Conventional Example 2 | Comparative Example 2 | Working Example 14 | Working Example 15 | Working Example 16 |
|---|---|---|---|---|---|
| Number of main grooves | 4 | 4 | 4 | 4 | 4 |
| Number of groove units | 0 | 0 | 4 | 4 | 4 |
| Groove width of the auxiliary groove (%) | — | — | 90 | 70 | 70 |

TABLE 2-continued

|  |  |  |  |  |  |
|---|---|---|---|---|---|
| Groove depth of the auxiliary groove (%) | — | — | 100 | 100 | 80 |
| Presence/absence of groove width variation of the main groove | Absent | Absent | Absent | Absent | Absent |
| Form of the main groove | Straight | Wave-like | Wave-like | Wave-like | Wave-like |
| Form of the auxiliary groove | — | — | Wave-like | Wave-like | Wave-like |
| Amplitude relationship between main grooves | — | Same | Same | Same | Same |
| Phase difference between the main groove and the auxiliary groove (°) | — | — | 180 | 180 | 180 |
| Presence/absence of phase difference of the groove units | — | — | Absent | Absent | Absent |
| Presence/absence of the sipes | Absent | Absent | Absent | Absent | Absent |
| Wet performance (index) | 100 | 96 | 110 | 111 | 113 |
| Quietness (index) | 100 | 98 | 107 | 107 | 107 |

|  | Working Example 17 | Working Example 18 | Working Example 19 | Working Example 20 |
|---|---|---|---|---|
| Number of main grooves | 4 | 4 | 4 | 4 |
| Number of groove units | 4 | 4 | 4 | 4 |
| Groove width of the auxiliary groove (%) | 70 | 70 | 70 | 70 |
| Groove depth of the auxiliary groove (%) | 80 | 80 | 80 | 80 |
| Presence/absence of groove width variation of the main groove | Present | Present | Present | Present |
| Form of the main groove | Wave-like | Wave-like | Wave-like | Wave-like |
| Form of the auxiliary groove | Wave-like | Wave-like | Wave-like | Wave-like |
| Amplitude relationship between main grooves | Same | Different | Different | Different |
| Phase difference between the main groove and the auxiliary groove (°) | 180 | 180 | 180 | 180 |
| Presence/absence of phase difference of the groove units | Absent | Absent | Present | Present |
| Presence/absence of the sipes | Absent | Absent | Absent | Present |
| Wet performance (index) | 113 | 113 | 113 | 114 |
| Quietness (index) | 109 | 110 | 114 | 114 |

As is clear from Table 1, compared with Conventional Example 1, with each of the tires of Working Examples 1 to 13, the wet performance and the quietness were improved in a well-balanced manner. On the other hand, with the tire of Comparative Example 1, the effects of improving the wet performance and the quietness were not obtained because only the main groove was configured to meander in a wave-like manner.

As is clear from Table 2, compared with Conventional Example 2, with each of the tires of Working Examples 14 to 20, the wet performance and the quietness were improved in a well-balanced manner. On the other hand, with the tire of Comparative Example 2, the effects of improving the wet performance and the quietness were not obtained because only the main groove was configured to meander in a wave-like manner.

What is claimed is:

1. A pneumatic tire comprising a tread portion extending in a tire circumferential direction to form an annular shape, a pair of side wall portions disposed on both sides of the tread portion, and a pair of bead portions disposed on inner sides in a tire radial direction of the side wall portions, wherein
the tread portion of said pneumatic tire comprising at least one groove unit comprising a main groove extending in the tire circumferential direction and an auxiliary groove extending in the tire circumferential direction that has a smaller width than that of the main groove,
both the main groove and the auxiliary groove meanders in a wave or zigzag manner,
the main groove and the auxiliary groove intersect so as to intertwine with each other,
a rib portion extending in the tire circumferential direction is disposed adjacent along the groove unit comprising the main groove and the auxiliary groove,
at least two of the groove units are provided in the tread portion, and
phases of the groove units differ from each other.

2. The pneumatic tire according to claim 1, wherein a groove width of the main groove and/or the auxiliary groove varies along the tire circumferential direction.

3. The pneumatic tire according to claim 1, wherein a phase of the main groove and a phase of the auxiliary groove differ from each other within the groove unit.

4. The pneumatic tire according to claim 1, wherein a groove width of the auxiliary groove is not more than 70% of a groove width of the main groove at a portion where the width of the main groove is smallest.

5. The pneumatic tire according to claim 1, wherein a groove depth of the auxiliary groove is smaller than a groove depth of the main groove.

6. The pneumatic tire according to claim 1, wherein an amplitude of the main groove included in a first groove unit of the groove units and an amplitude of the main groove included in second groove unit of the groove units differ from each other.

7. The pneumatic tire according to claim 1, wherein a groove width of the main groove varies along the tire circumferential direction.

8. The pneumatic tire according to claim 1, wherein a groove width of the auxiliary groove varies along the tire circumferential direction.

9. The pneumatic tire according to claim 1, wherein a groove width of the main groove at a portion where the width of the main groove is smallest is from 20% to 70% of the groove width of the main groove at a portion where the width of the main groove is greatest.

10. The pneumatic tire according to claim 1, wherein a groove width of the auxiliary groove is not less than 40% and not more than 70% of a groove width of the main groove at a portion where the width of the main groove is smallest.

11. The pneumatic tire according to claim 1, wherein a groove depth of the auxiliary groove is not more than 80% of the groove depth of the main groove.

12. The pneumatic tire according to claim 1, wherein a groove depth of the auxiliary groove is not less than 30% and not more than 80% of the groove depth of the main groove.

13. The pneumatic tire according to claim 1, wherein:
a phase of the main groove and a phase of the auxiliary groove differ from each other within the groove unit; and
a phase difference between the phase of the main groove and the auxiliary groove with respect to a period of the main groove is configured so as to be not less than 90° and not more than 270°.

14. The pneumatic tire according to claim 1, wherein a first shoulder region in the inner side in the tire width direction of the tread portion is provided with a plurality of sipes extending straight in a tire width direction and a second shoulder region in the outer side in the tire width direction of the tread portion is provided with a plurality of dimples interspersed along the auxiliary groove.

15. The pneumatic tire according to claim 1, wherein a groove width of the main groove is set to be in a range from 3.0 mm to 15.0 mm and a groove depth of the main groove is set to be in a range from 5.0 mm to 10.0 mm.

16. The pneumatic tire according to claim 1, wherein a groove width of the auxiliary groove is set to be in a range from 2.0 mm to 10.0 mm and a groove depth of the auxiliary groove is set to be in a range from 4.0 mm to 9.0 mm.

17. The pneumatic tire according to claim 1, wherein a groove width of the main groove and the auxiliary groove varies along the tire circumferential direction.

18. The pneumatic tire according to claim 1, wherein a plurality of block portions independent of the rib portion are partitioned between the main groove and the auxiliary groove, and wherein a plurality of sipes extending straight in a tire width direction are formed in each of the block portions.

19. A pneumatic tire comprising a tread portion extending in a tire circumferential direction to form an annular shape, a pair of side wall portions disposed on both sides of the tread portion, and a pair of bead portions disposed on inner sides in a tire radial direction of the side wall portions, wherein
the tread portion of said pneumatic tire comprising at least one groove unit comprising a main groove extending in the tire circumferential direction and an auxiliary groove extending in the tire circumferential direction that has a smaller width than that of the main groove,
both the main groove and the auxiliary groove meanders in a wave or zigzag manner,
the main groove and the auxiliary groove intersect so as to intertwine with each other,
a rib portion extending in the tire circumferential direction is disposed adjacent along the groove unit comprising the main groove and the auxiliary groove,
at least two of the groove units are provided in the tread portion, and
an amplitude of the main groove included in a first groove unit of the groove units and an amplitude of the main groove included in second groove unit of the groove units differ from each other.

20. A pneumatic tire comprising a tread portion extending in a tire circumferential direction to form an annular shape, a pair of side wall portions disposed on both sides of the tread portion, and a pair of bead portions disposed on inner sides in a tire radial direction of the side wall portions, wherein
the tread portion of said pneumatic tire comprising at least one groove unit comprising a main groove extending in the tire circumferential direction and an auxiliary groove extending in the tire circumferential direction that has a smaller width than that of the main groove,
both the main groove and the auxiliary groove meanders in a wave or zigzag manner,
the main groove and the auxiliary groove intersect so as to intertwine with each other,
a phase of the main groove and a phase of the auxiliary groove differ from each other within the groove unit,
a phase difference between the phase of the main groove and the auxiliary groove with respect to a period of the main groove is configured so as to be not less than 90° and not more than 270°, and
a rib portion extending in the tire circumferential direction is disposed adjacent along the groove unit comprising the main groove and the auxiliary groove.

* * * * *